United States Patent [19]

Wasson

[11] 4,072,370
[45] Feb. 7, 1978

[54] RADIAL MAGNETIC BEARING

[75] Inventor: Ken G. Wasson, Aptos, Calif.

[73] Assignee: Spectra-Flux, Inc., Watsonville, Calif.

[21] Appl. No.: 717,257

[22] Filed: Aug. 24, 1976

[51] Int. Cl.² .................................. F16C 32/04
[52] U.S. Cl. ........................................... 308/10
[58] Field of Search ............................... 308/10

[56] References Cited

U.S. PATENT DOCUMENTS

| 3,612,630 | 10/1971 | Rosensweig | 308/10 |
| 3,885,504 | 5/1975 | Baermann | 308/10 |

Primary Examiner—Richard A. Bertsch
Attorney, Agent, or Firm—Lowhurst & Aine

[57] ABSTRACT

Iron rings and radially polarized magnets are alternated with axially magnetized rings on both a rotor and a stator in which like poles of axial magnets on and between the rotor and stator face one another to produce a field within the air gap between the magnets equivalent to that produced by radially magnetized magnets, to redistribute flux within the air gap, to smooth out non-uniformity of individual magnetic flux distributions, to provide repulsion between the stator and the rotor, to minimize energy losses due to rotor rotation, to produce a uniform field in the air gap despite non-uniformity in the magnets, to reduce spin drag torques due to non-uniform magnetization to near zero value, to maximize the flux collection effectiveness of the iron rings, to fill the entire volume with a useful material, and to obtain a more intense field in the air gap, thereby providing a weight effective structure.

11 Claims, 2 Drawing Figures

RADIAL MAGNETIC BEARING

BACKGROUND OF THE INVENTION

1. Field of the Invention

The present invention relates to magnetic bearing suspensions for relatively rotatable elements.

2. Description of the Prior Art

Magnetic bearing suspensions have been devised using various configurations of permanent magnets and electromagnets to provide stable suspension of rotating shafts or other devices, see, for example, "A Magnetic Journal Bearing", by F. T. Backers, Phillips Technical Review, Vol. 22, No. 7, 1960/61. Such a device comprises a plurality of permanent magnet discs which are radially polarized, thereby resulting in problems due to its radial repulsion design. First, the radially magnetized rings are very difficult to manufacture, especially in small sizes required for weight-effective designs. Second, local nonuniformity of magnetic strength produces flux variations and resulting eddy current and hysteresis losses when the suspended shaft is rotated, thereby resulting in large undesirable "friction" drag torques.

SUMMARY OF THE INVENTION

The present invention overcomes these and other problems of the prior art by providing iron rings and radially polarized magnets which are alternated with axially magnetized rings on relatively rotatable elements to produce a flux field in the air gap equivalent to that produced by exclusively radially magnetized magnets. The iron rings are designed to have a sufficiently high permeability to permit the flux to be evenly distributed between the magnets and the air gap with reduced flux leakage, thereby producing a uniform field in the air gap despite any non-uniformity in the magnet wafers. As a result, spin drag torques due to nonuniform magnetization are therefore reduced to near zero value. Because higher flux densities are achievable in soft iron materials than in permanent magnets, a more intense field in the air gap and more weight-effective designs can be used than previously obtained. By utilizing radial repulsion, the invention becomes axially unstable, as distinguished from the prior art, which is radially unstable.

It is, therefore, an object of the present invention to provide a novel form of magnet bearing suspension.

Another object is to permit redistribution of flux between the magnets and in the air gap between relatively rotatable elements.

Another object is to produce uniform flux fields in the air gap despite nonuniformity in the magnetic wafers.

Another object is to achieve high flux densities in soft iron materials which are greater than those in permanent magnets.

Another object is to provide the capability of using more intense fields in the air gap and more weight-effective designs than previously obtainable.

Another object is to maximize filling of the entire volume of the bearing with useful materials.

Another object is to distribute the iron volume so that it has a uniformly high flux density throughout.

Other aims and objects as well as a more complete understanding of the present invention will appear from the following explanation of an exemplary embodiment and the accompanying drawing thereof.

DESCRIPTION OF THE PREFERRED EMBODIMENT

Figures 1, 2:
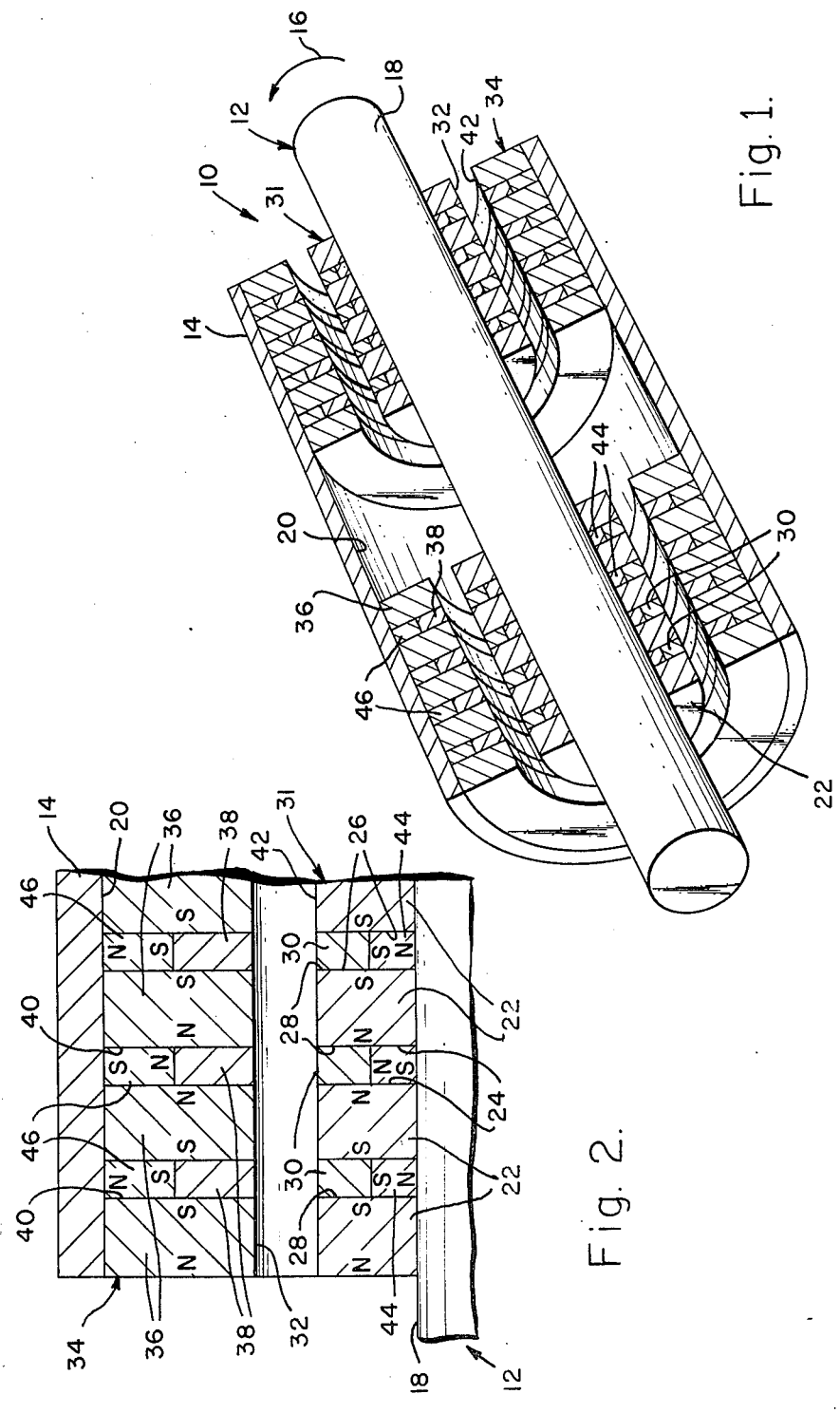
FIG. 1 is a perspective view in section of a preferred embodiment of the present invention.
FIG. 2 illustrates a partial cross-section of the embodiment depicted in FIG. 1.

As shown in FIGS. 1 and 2, a radial magnetic bearing 10 comprises a non-magnetic shaft 12 and a non-magnetic housing 14 which are positioned so as to enable relative rotation therebetween. As configured, shaft 12 is shown to be a rotor as indicated by arrow 16 with housing 14 acting as a stator. It is to be understood, however, that shaft 12 may be made stationary with respect to housing 14, if the particular use of the present invention requires such configuration.

Regardless of the particular end use, shaft 12 is provided with a circumferential surface 18 and housing 14 is provided with an inner cylindrical surface 20 which is substantially centered about and spaced from surface 18. A first plurality of axially magnetized ring magnets 22 are secured to shaft 12 at surface 18 in any convenient manner. Each of magnets 22 is of substantial ring shape and is axially magnetized to define pole faces 24 and 26 which are placed in such a fashion that like poles are juxtaposed, e.g. south "S" poles 26 face one another and north "N" poles 24 face one another. Openings 28 space adjacent magnets apart.

Within openings 28 are placed ferro-magnetic rings 30, which are bonded or otherwise secured in any convenient manner to pole faces 24 and 26, to form a ring magnet-iron ring structure 31. It is important, in the practice of the present invention, that ferro-magnetic rings 30 are purposely saturated by the magnetic field of magnets 22 in order to smooth out any non-uniform magnetic characteristics of the magnets. Such saturation is obtained by providing an appropriate width of rings 30.

A similar ring magnet-iron ring structure 34 comprises a plurality of ring magnets 36 and ferro-magnetic rings 38 which have a configuration similar to that of magnets 22 and rings 30 of shaft structure 31. Specifically, south "S" poles face one another and north "N" poles face one another, with the faces of poles of adjacent magnets 36 defining openings 40 for rings 38.

Surfaces 32 and 42 are aligned axially so that like poles on the housing and the shaft face each other, in order to provide radial repulsion forces between the housing and the shaft.

Rings 44 and 46 comprise radially polarized ring magnets and are inserted respectively in spaces 28 and 40 with their "S" poles facing toward iron rings 30 and 38 in the case where the iron rings are positioned between "S" pole faces of magnets 22 and 36, and with "N" poles facing toward iron rings 30 and 38 in the case where the iron rings are positioned between "N" pole faces of magnets 22 and 36. This arrangement provides a means for reducing flux leakage parallel to the axis of the bearing near surface 18 and near surface 20 and is of particular importance when it is desired to improve the useful flux level in the gap between structures 32 and 34 while using highly saturated iron rings 30 and 38.

Facing surfaces 32 and 42 are slightly spaced from one another to provide an air gap between structures 31 and 34, to enable relative rotation between shaft 12 and housing 14 and to permit the radial repulsion between the two structures 31 and 34 to support shaft 12 within housing 14 or, conversely, housing 14 about shaft 12.

Although a particular number of iron rings 30 and 38 and ring magnets 22 and 36 are illustrated, it is to be understood that any number of iron rings and ring magnets may be axially stacked up. In general, the larger the number of iron rings and ring magnets, the better the radial repulsion and bearing support. Furthermore, it is to be understood that the ends of the ring magnet-iron structure may comprise ring magnets; however, it is preferred that the ends be iron rings as affording better shielding to avoid a large external magnetic field.

Although the invention has been described with reference to a particular embodiment thereof, it should be realized that various changes and modifications may be made therein without departing from the spirit and scope of the invention.

What is claimed is:

1. A radial magnetic bearing comprising:
    a shaft having a circumferential surface and a housing having an inner cylindrical surface substantially centered about and spaced from said circumferential surface;
    a first plurality of axially magnetized ring magnets secured to said circumferential surface of said shaft and being axially terminated in faces for defining magnetic poles, in which like poles of adjacent ones of said magnets face one another, said like pole faces of said adjacent magnets being spaced apart from one another for defining means for defining a configuration of openings;
    a first plurality of ferro-magnetic rings positioned in said openings means and secured to said pole faces, for providing a flux path tangential to said circumferential surface for thereby smoothing out any non-uniform magnetization of said magnets;
    a first plurality of radially magnetized ring magnets positioned radially adjacent said first plurality of ferro-magnetic rings;
    a second plurality of axially magnetized ring magnets secured to said inner cylindrical surface of said housing and being axially terminated in faces for defining magnetic poles, in which like poles of adjacent ones of said magnets face one another, said like pole faces of said adjacent magnets being spaced apart from one another for defining means for defining a configuration of openings, said like poles of said second plurality of axially magnetized ring magnets being radially aligned with said like poles of said first plurality of axially magnetized ring magnets for radially repelling said first and second plurality of magnets from one another and thereby for centering of said shaft with respect to said housing;
    a second plurality of ferro-magnetic rings positioned in said openings means of said second plurality of magnets and secured to said pole faces thereof, for providing a flux path tangential to said inner cylindrical surface for thereby smoothing out any non-uniform magnetization of said second plurality of said magnets; and
    a second plurality of readially magnetized ring magnets positioned radially adjacent said second plurality of ferro-magnetic rings.

2. A bearing as in claim 1 wherein said shaft comprises a rotatable element and said housing comprises an element fixed with respect to said shaft.

3. A bearing as in claim 1 wherein said first plurality of said radially magnetized ring magnets are positioned between said first plurality of said ferro-magnetic rings and said shaft, and said second plurality of said radially magnetized ring magnets are positioned between said second plurality of said ferro-magnetic rings and said housing inner cylindrical surface.

4. A bearing as in claim 3 wherein like poles of both said first and second plurality of said radially magnetized ring magnets respectively face towards said first and second plurality of said ferro-magnetic rings between like poles of said first and second plurality of said axially magnetized ring magnets, for reducing flux leakage adjacent said shaft and said housing.

5. A radial magnetic bearing comprising:
    first means having affixed thereto structure for defining a plurality of axially alternating axially magnetized ring magnets, and radially positioned ferro-magnetic rings and radially polarized ring magnets all secured to one another; and
    second means having affixed thereto structure for defining a plurality of axially alternating axially magnetized ring magnets, and radially positioned ferro-magnetic rings and radially polarized ring magnets all secured to one another, said second means axially magnetized ring magnets and ferro-magnetic rings facing said first means axially magnetized ring magnets and ferro-magnetic rings and having means therebetween for defining a space and for centering of said first means with respect to said second means by radial repulsion between said first means structure and said second means structure;
    both said structures of said first and second means each having shapes of said ferro-magnetic rings, and both said structures having means for providing saturation of said ferro-magnetic rings, for maximizing flux collection effectiveness of said ferro-magnetic rings, for smoothing any non-uniform magnetic fields of said ring magnets, and for reducing flux leakage.

6. The radial magnetic bearing of claim 5 wherein like poles of said axially magnetized ring magnets in each of said structures and in said facing structures are placed substantially opposite one another for providing the radial repulsion.

7. The radial magnetic bearing of claim 5 wherein each of said first and second means structures terminate in said ferro-magnetic rings for providing a shielding for avoiding large magnetic fields external to said structures.

8. The radial magnetic bearing of claim 5 wherein each of said first and second means structures terminate in said ring magnets.

9. A bearing as in claim 5 wherein said first radially polarized ring magnets are positioned between said first ferro-magnetic rings and a shaft, and said second radially polarized ring magnets are positioned between said second ferro-magnetic rings and a housing.

10. A bearing as in claim 5 wherein like poles of both said first and second radially polarized ring magnets respectively face towards said first and second ferro-magnetic rings between like poles of said first and second axially magnetized ring magnets, for reducing flux leakage adjacent said shaft and said housinng.

11. A radial magnetic bearing comprising:
    a shaft having a circumferential surface and a housing having an inner cylindrical surface substantially centered about and spaced from said circumferential surface;

a first plurality of axially magnetized ring magnets secured to said circumferential surface of said shaft and being axially terminated in faces for defining magnetic poles, in which like poles of adjacent ones of said magnetics face one another, said like pole faces of said adjacent magnets being spaced apart from one another for defining means for defining a configuration of openings;

a first plurality of ferromagnetic rings positioned in said opening means and secured to said pole faces, for providing a flux path tangential to said circumferential surface for thereby smoothing out any nonuniform magnetization of said magnets;

a second plurality of axially magnetized ring magnets secured to said inner cylindrical surface of said housing and being axially terminated in faces for defining magnetic poles, in which like poles of adjacent ones of said magnets face one another, said like pole faces of said adjacent magnets being spaced apart from one another for defining means for defining a configuration of openings, said like poles of said second plurality of axially magnetized ring magnets being radially alinged with said like poles of said first plurality of axially magnetized ring magnets for radially repelling said first and second plurality of magnets from one another and thereby for centering of said shaft with respect to said housing; and a second plurality of ferromagnetic rings positioned in said opening means of said second plurality of magnets and secured to said pole faces thereof, for providing a flux path tangential to said inner cylindrical surface for thereby smoothing out any nonuniform magnetization of said second plurality of said magnets, said circumferential surface and said inner cylindrical surface being continuous and parallel.

* * * * *

UNITED STATES PATENT OFFICE
CERTIFICATE OF CORRECTION

Patent No. 4,072,370  Dated February 7, 1978

Inventor(s) Ken G. Wasson

It is certified that error appears in the above-identified patent and that said Letters Patent are hereby corrected as shown below:

Column 3, line 63, "readially" should read
-- radially --.

Column 6, line 5, "alinged" should read -- aligned --.

Signed and Sealed this

Sixth Day of June 1978

[SEAL]

Attest:

RUTH C. MASON
Attesting Officer

DONALD W. BANNER
Commissioner of Patents and Trademarks